(12) United States Patent
Mizuguchi et al.

(10) Patent No.: US 11,932,104 B2
(45) Date of Patent: Mar. 19, 2024

(54) FUEL TANK WITH SUPPORT PILLAR

(71) Applicant: NIPPON STEEL CORPORATION, Tokyo (JP)

(72) Inventors: Toshinori Mizuguchi, Tokyo (JP); Masahiro Fuda, Tokyo (JP); Akiyoshi Inoue, Tokyo (JP); Junji Nakano, Tokyo (JP); Yasuaki Naito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 173 days.

(21) Appl. No.: 17/618,265

(22) PCT Filed: Jun. 12, 2020

(86) PCT No.: PCT/JP2020/023141
§ 371 (c)(1),
(2) Date: Dec. 10, 2021

(87) PCT Pub. No.: WO2020/251001
PCT Pub. Date: Dec. 17, 2020

(65) Prior Publication Data
US 2022/0332184 A1 Oct. 20, 2022

(30) Foreign Application Priority Data
Jun. 12, 2019 (JP) ................ 2019-109355

(51) Int. Cl.
*B60K 15/03* (2006.01)
*B60K 15/077* (2006.01)

(52) U.S. Cl.
CPC .... *B60K 15/077* (2013.01); *B60K 2015/0344* (2013.01); *B60K 2015/03453* (2013.01); *B60K 2015/0777* (2013.01)

(58) Field of Classification Search
CPC .......... B60K 2015/03453; B60K 2015/03032; B60K 2015/0344; B60K 2015/0777; B60K 15/077
See application file for complete search history.

(56) References Cited

U.S. PATENT DOCUMENTS

| 5,758,796 A * | 6/1998 | Nishimura ................ F17C 1/06 220/651 |
| 2005/0282433 A1* | 12/2005 | Pixley .................. H01R 24/542 439/578 |
| 2006/0207991 A1 | 9/2006 | Sugiura |

(Continued)

FOREIGN PATENT DOCUMENTS

| DE | 10 2012 108 851 A1 | 3/2014 |
| EP | 2 754 581 A1 | 7/2014 |

(Continued)

*Primary Examiner* — Stephen J Castellano
(74) *Attorney, Agent, or Firm* — Birch, Stewart, Kolasch & Birch, LLP

(57) ABSTRACT

A fuel tank (10) includes: a lower panel (12) made of steel and an upper panel (11) made of steel; and at least one pillar (100) made of steel which is disposed in an interior space (V) formed by the lower panel (12) and the upper panel (11) facing each other and of which a first end portion is fixed to the lower panel (12) and a second end portion is fixed to the upper panel (11) in a state where the second end portion is disposed in a hole formed in the upper panel (11).

7 Claims, 8 Drawing Sheets

(56) References Cited

U.S. PATENT DOCUMENTS

| | | | |
|---|---|---|---|
| 2009/0293448 A1* | 12/2009 | Grote | F02K 9/64 60/204 |
| 2011/0233207 A1* | 9/2011 | Okawada | B62J 35/00 220/212 |
| 2012/0024868 A1* | 2/2012 | Menke | B60K 15/03 220/653 |
| 2012/0325822 A1* | 12/2012 | Pozgainer | B60K 15/03177 220/562 |
| 2013/0008908 A1 | 1/2013 | Hill et al. | |
| 2015/0069070 A1 | 3/2015 | Iwaya et al. | |
| 2019/0126745 A1* | 5/2019 | Amano | B60K 15/03177 |

FOREIGN PATENT DOCUMENTS

| | | |
|---|---|---|
| EP | 3 572 265 A1 | 11/2019 |
| JP | 9-58280 A | 3/1997 |
| JP | 9-96399 A | 4/1997 |
| JP | 2005-162010 A | 6/2005 |
| JP | 2006-256462 A | 9/2006 |
| JP | 2007-290600 A | 11/2007 |
| JP | 2012-245974 A | 12/2012 |
| JP | 5843067 B2 | 1/2016 |
| JP | 6350781 B1 | 7/2018 |
| JP | 2018-203083 A | 12/2018 |
| JP | 2019-77387 A | 5/2019 |
| KR | 10-2014-0092261 A | 7/2014 |

* cited by examiner

Fuel Tank includes a columnar beam made of steel and is attached to a pair of wall surfaces, which face each other, of at least one of the lower panel or the upper panel

FUEL TANK WITH SUPPORT PILLAR

This application is the national stage (Rule 371) of international application No. PCT/JP2020/023141 filed 12 Jun. 2020.

TECHNICAL FIELD OF THE INVENTION

The present invention relates to a fuel tank, and more particularly to a fuel tank that is made of steel and has pressure resistance and weight reduction.

Priority is claimed on Japanese Patent Application No. 2019-109355, filed Jun. 12, 2019, the content of which is incorporated herein by reference.

RELATED ART

Tanks made of steel have long been used as vehicle fuel tanks, but tanks made of a resin have been increasingly used in recent years. The reason for this is that a multi-layered resin tank has been developed as a measure for preventing the permeation of fuel and a resin is advantageous in reducing weight in terms of the specific gravity of the material.

In one technique, protrusions are formed on the upper and lower surfaces of a resin tank. The protrusions face each other, protrude inward, and are welded to each other to form a pillar. Such a technique is disclosed in, for example, Patent Document 1 as one technique that make it possible to reduce the weight of a resin tank.

Since a fuel tank is installed in the underbody of a vehicle, that is, at a place close to the road surface, the fuel tank and fuel are heated due to reflection from the road surface especially in summer and the temperature of the fuel may rise to 50° C. or higher. Accordingly, it is conceivable that a resin is softened and the resin is deflected due to the weight of the fuel. Further, the deflection increases as the vapor pressure of the fuel rises due to an increase in temperature. In a case where pillars are provided, the deflection of the resin is reduced and the amount of deformation of the fuel tank is suppressed.

Since the operating time of an engine has shortened with the spread of hybrid vehicles (HV) or plug-in hybrid vehicles (PHV) in recent years, gasoline vapor generated in a fuel tank does not always purge to the engine and internal pressure may increase. For this reason, the pressure resistance of the fuel tank has been increased, and the rigidity of the resin tank has been improved by adding more pillars into the resin tank. The sheet thickness has been increased in tanks made of steel to cope with this, but an influence on fuel efficiency during travel of the vehicle has also been pointed out since an increase in the sheet thickness causes an increase in the weight of the fuel tank. Since a battery and a case storing the battery are required in HV and PHV, the weight of the entire vehicle is increased. Due to the above reason, there is even more demand for an increase in the pressure resistance of the fuel tank and a reduction in the weight of the fuel tank.

Accordingly, a method of reducing the weight of a steel fuel tank by installing pillars made of a resin in the tank to improve pressure resistance is disclosed as Patent Document 2. In such a method, threading is performed on a moutinging jig for reinforcing made of metal and resin pillars are threadedly engaged with the moutinging jig for reinforcing, but at least a parallel surface on which the moutinging jig for reinforcing is to be installed needs to be formed on a lower surface facing an upper surface of the fuel tank.

PRIOR ART DOCUMENT

Patent Document

[Patent Document 1] Japanese Unexamined Patent Application, First Publication No. 2006-256462
[Patent Document 2] Japanese Patent No. 6350781
[Patent Document 3] Japanese Unexamined Patent Application, First Publication No. 2012-245974

DISCLOSURE OF THE INVENTION

Problems to be Solved by the Invention

In recent years, batteries for HVs and PHVs have tended to increase in capacity. For this reason, a large area under the floor of a vehicle has been used to mount a battery. Since the fuel tank has typically been placed near a battery mounting position, attempts have been made to reduce the horizontal projected area as much as possible. That is, fuel tanks having a shape close to a cube or a rectangular parallelepiped have been employed for HVs and PHVs. Further, it is expected that the full capacity of the fuel tank will decrease due to the improvement of fuel efficiency.

Fuel injections systems are the mainstream of current vehicle fuel supply systems and include a fuel pump installed in the fuel tank. Accordingly, an opening portion used to attach the pump is required on an upper panel. The diameter of this opening portion is usually in the range of 100 to 150 mm. However, the area around the opening is a part where a place for installing pillars cannot be secured, and a part which is easily deformed by a change in pressure inside the fuel tank. Accordingly, Patent Document 3 discloses a method of ensuring rigidity with resin pillars that have a universal joint structure and are provided at the circumferential edge of the opening portion in the case of a resin tank.

It is important to prevent the deformation of a pump attachment portion caused by a change in internal pressure even in the case of a tank made of steel. However, since the horizontal projected area of the fuel tank is reduced and an opening portion having a diameter of about 100 to 150 mm needs to be provided at a pump attachment portion, it is difficult to secure a place, at which a jig made of metal and used to attach pillars is to be installed, in the method disclosed in Patent Document 2. In order to prevent the deforming of the panel that is caused by pressure fluctuation at the pump attachment portion, the gauge down of the panel of the steel fuel tank is restricted.

The invention has been made in consideration of the above-mentioned problems, and an object of the invention is to increase the pressure resistance of a fuel tank and to reduce the weight of the fuel tank.

Means for Solving the Problem

The invention proposes the following means.
(1) A fuel tank according to an aspect of the invention includes: a lower panel made of steel and an upper panel made of steel; and at least one pillar made of steel which is disposed in an interior space formed by the lower panel and the upper panel facing each other and of which a first end portion is fixed to the lower panel and a second end portion is fixed to the upper panel in a state where the second end portion is disposed in a hole formed in the upper panel.

(2) In (1), the fuel tank may further include: a first nut which is made of steel and is fixed to an inner surface of the lower panel and to which the first end portion of the pillar is fitted; a flange that is disposed on an inner surface of the upper panel and is fixed to the pillar; and a second nut which is made of steel and is disposed on an outer surface of the upper panel and to which the second end portion of the pillar is fitted so that the upper panel is interposed between the flange and the second nut.

(3) In (2), the fuel tank may further include: a tin-plated layer or a tin-zinc-plated layer that is provided on outer surfaces of the pillar, the first nut, and the second nut.

(4) In (2) or (3), the fuel tank may further include: solder that seals a gap between the upper panel and the second nut.

(5) In any one of (1) to (4), a columnar beam made of steel may be attached to a pair of wall surfaces, which face each other, of at least one of the lower panel or the upper panel. (See FIG. 16).

(6) In (5), a first baffle plate may be attached to the beam.

(7) In any one of (1) to (6), a second baffle plate may be attached to the pillar.

Effects of the Invention

According to the invention, as described above, the pressure resistance of a fuel tank can be increased and the weight of the fuel tank can be reduced.

EMBODIMENTS OF THE INVENTION

Figure 1:
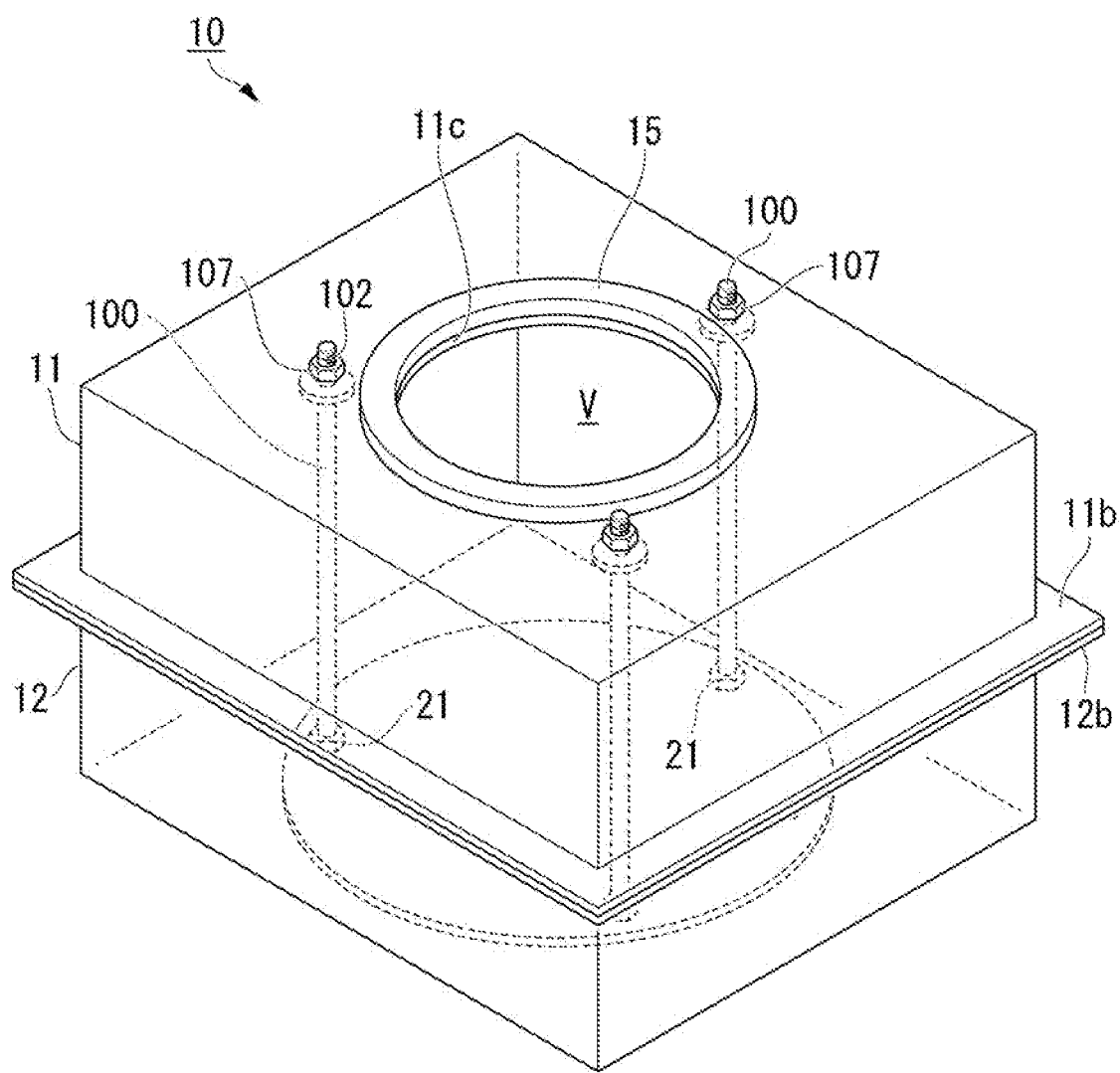
FIG. 1 is a perspective view showing the outline of a fuel tank according to an embodiment of the invention.

Preferred embodiments of the invention will be described in detail below with reference to the accompanying drawings. In this specification and the drawings, components having substantially the same functional configuration will be denoted by the same reference numeral and the repeated description thereof will be omitted.

<1. Structure of Fuel Tank>

Figure 2:
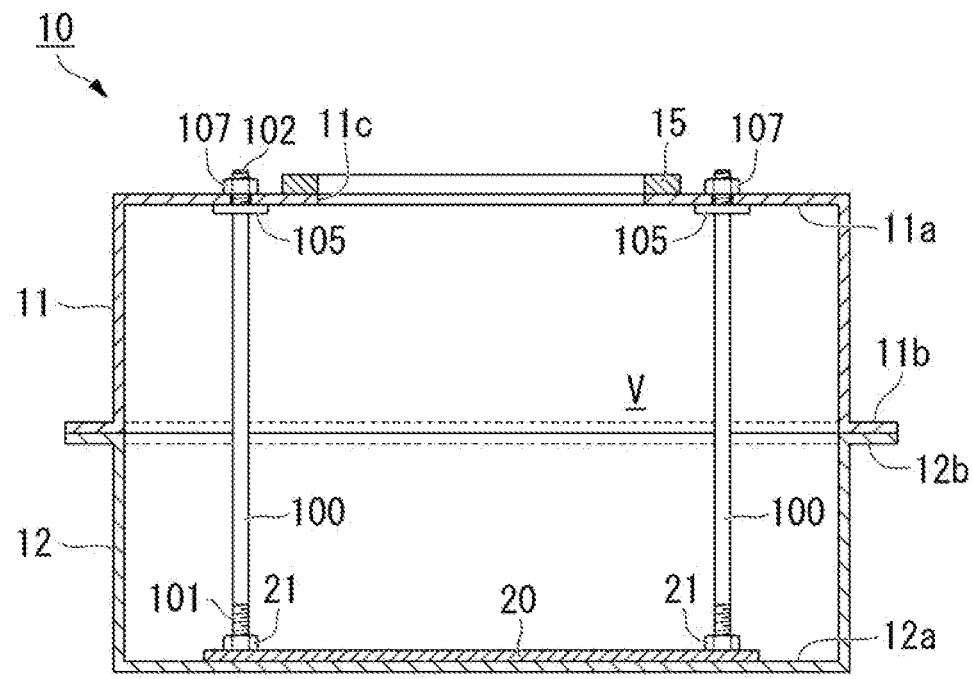
FIG. 2 is a longitudinal sectional view showing the outline of the fuel tank according to the embodiment.
Figure 3:
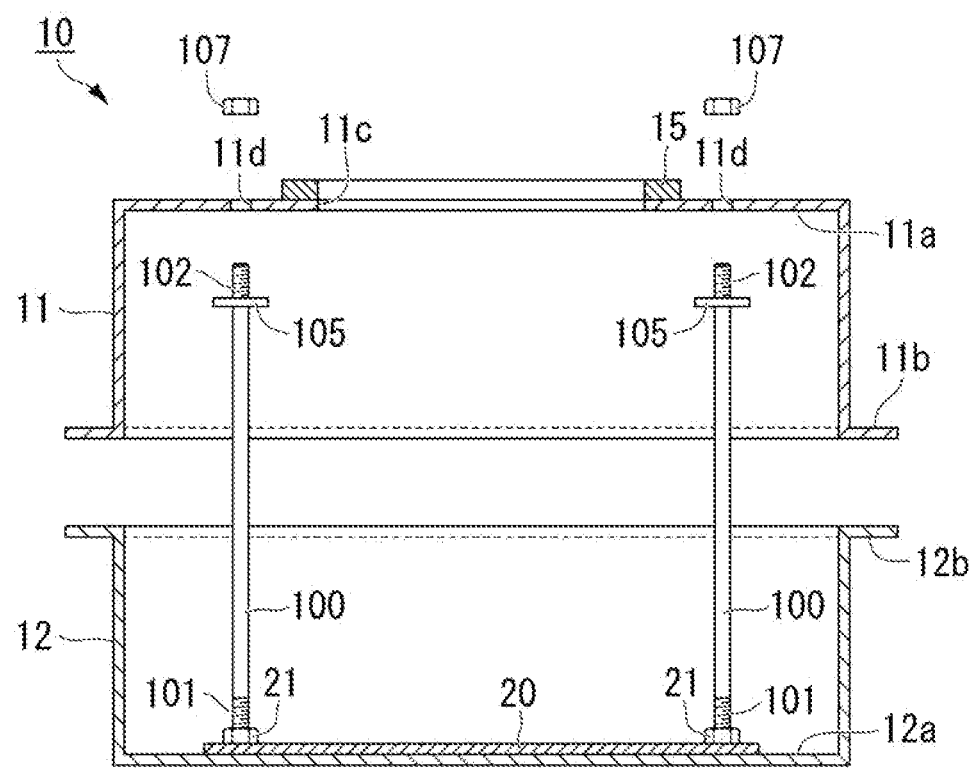
FIG. 3 is a sectional view showing the outline of a state where the fuel tank according to the embodiment is separated into an upper panel and a lower panel.

First, the schematic configuration of a fuel tank according to an embodiment of the invention will be described with reference to FIGS. 1 to 3. FIG. 3 is a sectional view showing the outline of a state where the fuel tank 10 according to the embodiment of the invention is separated into an upper panel 11 and a lower panel 12.

The fuel tank 10 according to this embodiment is, for example, a vehicle fuel tank and includes an upper panel 11 made of steel and a lower panel 12 made of steel. Since the shape of the fuel tank 10 made of steel is simpler than the shape of a fuel tank made of a resin and the fuel tank 10 is made of metal, the fuel tank 10 has an advantage that gasoline vapor is difficult to leak. As shown in FIG. 2, the upper panel 11 includes a recessed portion 11a that forms an interior space V for storing fuel, and a flange portion 11b that is formed at an edge portion of a recessed portion 11a to join the upper panel 11 to the lower panel 12. Likewise, the lower panel 12 includes a recessed portion 12a that forms the interior space V for storing fuel, and a flange portion 12b that is formed at an edge portion of a recessed portion 12a to join the upper panel 11 to the lower panel 12. The flange portion 11b of the upper panel 11 and the flange portion 12b of the lower panel 12 are joined to each other by, for example, seam welding.

The interior space V is formed by the upper panel 11 and the lower panel 12 facing each other.

The fuel tank 10 is often positioned at a peripheral portion of a battery mounting position in the vehicle. For this reason, the fuel tank 10 has the shape of a rectangular parallelepiped that can keep a horizontal projected area as small as possible while keeping a volume as large as possible. A corner portion between adjacent surfaces among six surfaces of the rectangular parallelepiped-shaped fuel tank 10 may be rounded.

<2. Pillar>

[Pillar Structure]

The fuel tank 10 according to this embodiment includes pillars 100 that are provided in the interior space V and extend in a direction where the upper panel 11 and the lower panel 12 face each other. The pillars 100 are reinforcing members that are provided to increase the rigidity of the fuel tank 10. The pillar 100 is formed of a wire rod or a bar (a pillar made of steel). Here, the reason why steel is selected for the pillar 100 is that steel is inexpensive and has high strength. The pillar 100 may be made of carbon steel or stainless steel and may be appropriately subjected to coating, such as plating. The number of the pillars 100 included in the fuel tank 10 is not limited and may be one or more. In a case where the number of the pillars 100 is three, the deformation of the fuel tank 10 can be efficiently suppressed while the volume occupied in the interior space V by the pillars can be reduced as much as possible. In particular, it is preferable that portions of the fuel tank 10 at which relatively large deformation is expected are obtained by deformation analysis calculation and three pillars 100 are arranged at these portions. Since the pillars are arranged as described above, deformation of the upper panel 11 and the lower panel 12 can be efficiently suppressed. In particular, since the pillars 100 are arranged so as to surround the periphery of a first hole 11c that is used to attach a pump, deformation of the fuel tank 10 including the upper panel 11 and the lower panel 12 can be efficiently suppressed.

In the case of a high-pressure tank, internal pressure rises up to, for example, about 40 kPa. The force applied to the inner surfaces of the upper panel 11 and the lower panel 12 of the fuel tank 10 shown in FIG. 1 is 40 kN/m². Assuming that the area of the inner surface of the fuel tank 10 is 1 m², a force of 40 kN (4.08 tons) is applied to this inner surface. Not all of this force is applied to the pillars 100, but it is necessary to design so that the load applied to the wall surface of the fuel tank 10 and the load applied to the pillar 100 are balanced by designing an appropriate sheet thickness.

A tensile force of several tens to several hundreds kgf is applied to the pillars 100 at the time of positive pressure, and a compressive force of several tens to several hundreds kgf is applied to the pillars 100 at the time of negative pressure. For example, stress applied to a pillar 100 in a case where a tensile force or a compressive force of 100 kgf (980 N) is applied and the pillar 100 having a diameter of 6 mm is used is 34.6 MPa from Equation of $(100 \times 9.8 \div (3 \times 3 \times 3.14))$. Since the tensile strength of a steel material of S10C specified in JIS-G-4051:2016 is 310 MPa or more, it is found that sufficient strength is obtained even though the pillar has a diameter of 6 mm. The significance of the installation of the pillars 100 is to suppress the displacement of the panels 11 and 12 caused by pressure. Accordingly, the length of the pillar 100 should not significantly change depending on stress. Stress applied to the pillar 100 is equal to or less than an elastic limit and is preferably equal to or less than half of the yield point. The yield point is generally defined as a load at which 0.2% proof stress, that is, permanent strain of 0.2% remains at the time of a tensile test. However, since a stress-strain curve is slightly non-linear near a yield point, the diameter of the pillar 100 may be designed so that a load equal to or less than a half of a yield point is applied to the pillar in the sense that the pillar is used in a complete elastic range.

For example, in a case where it is assumed that predetermined internal pressure acts on the fuel tank 10, the pillar 100 made of steel has a diameter of 6 mm and is a portion positioned in the interior space V according to the height dimension of the fuel tank 10. It is assumed that the height of the fuel tank 10 (the length of a portion of the pillar 100 positioned in the interior space V) is 200 mm. In this case, a portion of the pillar 100, which is made of steel, positioned in the interior space V has a volume of 5.65 cm³ and a mass of 44.4 g. Further, in a case where the yield strength of the pillar 100 made of steel is 300 MPa, stress of about 150 MPa or less corresponding to a complete elastic range can be set as allowable stress in use. In contrast, in a case where pillars made of a resin are applied to a fuel tank 10 on which the same internal pressure as the above-mentioned predetermined internal pressure acts and which has the same height, allowable stress in use needs to be about 10 MPa or less and the design needs to be made in consideration of the fact that the pillar made of a general resin (for example, polyacetal or the like) has low strength, such as tensile strength and yield strength, has a low melting point of about 160° C., and has low stability in mechanical properties, such as Young's modulus, strength, and the complete elastic range, with respect to a change in environmental temperature. For this reason, in a case where a pillar made of a resin is used, the pillar has a diameter of at least 24 mm and a height (length) of 200 mm in terms of a size. In this case, a portion of the pillar, which is made of a resin, positioned in the interior space V has a volume of 90 cm³ and a mass of 128 g, and the values of both volume and mass in the case of the pillar made of a resin are larger than the values of those in the case of the pillar made of steel. In particular, the difference in volume is very large. As described above, the pillar 100 made of steel can be made to have a volume and a mass smaller than those of the pillar 100 made of a resin while maintaining the required strength. Accordingly, the volume occupied in the interior space V of the fuel tank 10 by the pillars 100 can be made as small as possible in the fuel tank 10 according to this embodiment. For this reason, the effective volume (volume) for storing fuel in the interior space V of the fuel tank 10 can be secured as large as possible. In addition, since a reduction in weight can be realized while the strength of the pillar 100 is maintained, the fuel tank 10 including the pillars 100 can be made light and proof stress against internal pressure can be increased.

Figure 4:
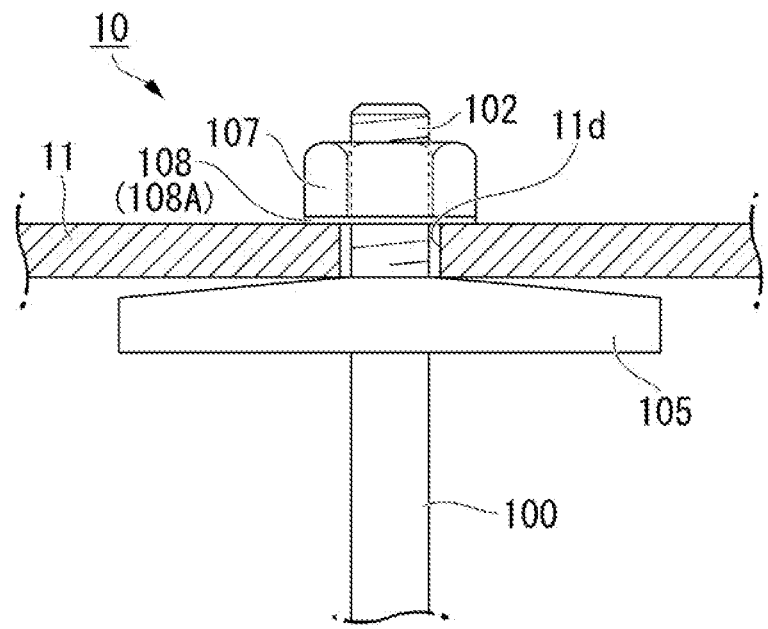
FIG. 4 is a sectional view of main portions near a flange.

Both ends of the pillar 100 are subjected to threading and fixed with nuts. As shown in FIG. 3, a first male screw 101 is formed at the lower end portion (first end portion) of each pillar 100 and a second male screw 102 is formed at the upper end portion (second end portion) of each pillar 100. In order to prevent the deformation of the panels 11 and 12 at the time of negative pressure, an annular flange 105 is fixed to the pillar 100 at a position corresponding to the inner height of the fuel tank 10 as shown in FIGS. 2 and 3. The flange 105 is installed in a state where the central axis of the annular flange 105 in a plan view extends along the axis of the pillar 100 and the flange 105 extends from the whole circumference of the pillar 100 in a direction perpendicular to the whole circumference. Accordingly, since the pillar 100 can receive a load from the upper panel 11 with a large area through the flange 105 at the time of negative pressure of the fuel tank 10, and the like, the deformation of a portion near a second hole 11d including the inner edge of the second hole 11d formed in the upper panel 11 can be suppressed. Therefore, the durability of the fuel tank 10 can be improved. Here, there is a concern that the upper panel 11 is displaced and deformed with the outer peripheral edge of the flange 105 as a fulcrum at the time of negative pressure and subjected to fatigue. For this reason, the outer diameter of the flange 105 is set so that the fuel tank passes a target positive/negative pressure-fatigue test. Further, a slightly tapered portion, which is inclined downward toward the outside in the radial direction of the flange 105, is formed on the upper surface of the flange 105 as shown in FIG. 4, so that the amount of strain of the upper panel 11, which is to be in contact with the outer peripheral edge of the flange 105, can be reduced.

Collision safety should also be considered for the fuel tank 10. That is, the leakage of fuel, which is caused by the fracture of the panels 11 and 12 to which the pillars 100 are attached, should be prevented at the time of collision. Accordingly, the diameter of the lower screw of each pillar 100 or the height of a thread and the number of threads of each pillar 100 can also be adjusted so that first nuts 21, which are attached to a chamber stay 20 provided on the lower panel 12 shown in FIGS. 2 and 3, and threaded engagement portions of the pillars 100 are fractured.

The pillars 100 may be subjected to surface treatment in the sense that corrosion is prevented. Electrogalvanizing, tin electroplating, tin-zinc electroplating, and nickel electroplating are recommended. That is, a galvanized layer, a tin-plated layer, a tin-zinc-plated layer, and a nickel-plated layer may be provided on the outer surface of the pillar 100. In a case where a tin-zinc-plated steel sheet is used for the panels 11 and 12 and a chamber stay, tin-zinc electroplating may be selected in the sense that electrolytic corrosion in the fuel tank 10 is prevented.

[Attachment Structure]

The attachment of the pillars 100 is performed using the first nuts 21 made of steel.

Figure 5:
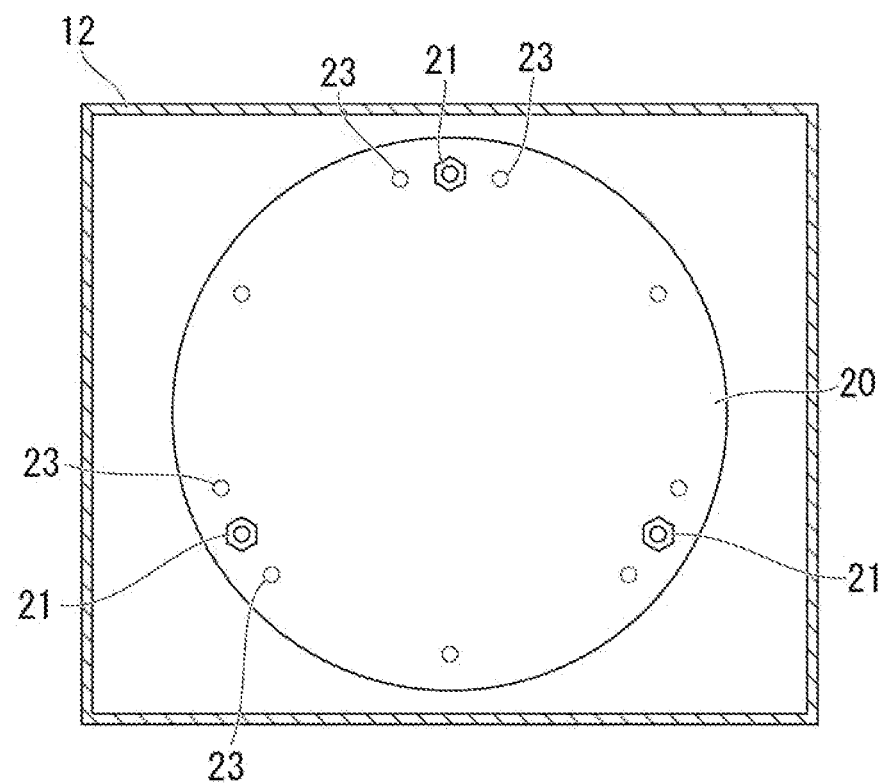
FIG. 5 is a top view of the inner surface of the lower panel.

As shown in FIG. 5, the circular chamber stay 20 is used to attach the first nuts 21 on the lower panel 12. FIG. 5 shows a state where the first nuts 21 are attached to the chamber stay 20 at three positions. Holes, which have a diameter larger than the diameter of a hole of the first nut 21 by 1 mm, are formed in the chamber stay 20 at the attachment portions of the first nuts 21. The first nuts 21 are fixed to the attachment portions by projection welding. The first nuts 21 may be provided with projections or the chamber stay 20 may be provided with projections (protrusions).

The first nuts 21 are provided on the inner surface of the lower panel 12 so as to correspond to the pillars 100.

Figure 6:
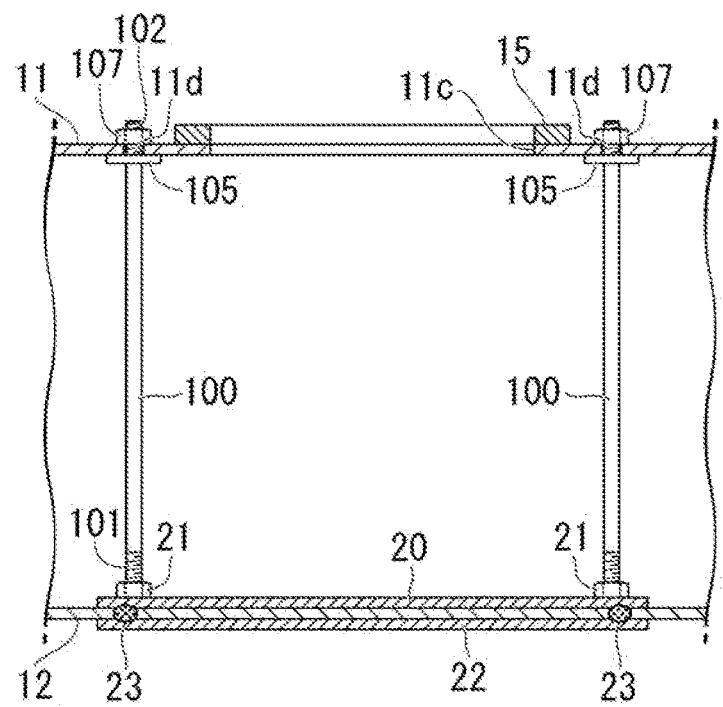
FIG. 6 is a longitudinal sectional view showing the configuration of pillars according to the embodiment.

The chamber stay 20 to which the first nuts 21 are attached is attached to the lower panel 12 by spot welding. However, in a case where a reinforcement (reinforcing member) 22 is attached to the outer surface of the lower panel 12 as shown in FIG. 6 at this time, the deformation of the lower panel 12 caused by pressure fluctuation can be suppressed. Welded portions, which are formed by spot welding, are denoted in FIG. 6 by reference numeral 23.

In a case where the reinforcement 22 is attached, there is a possibility that a gap is formed between the lower panel 12 and the reinforcement 22 at the time of pressure fluctuation. In a case where dust enters this gap, there is a concern that the pressure fatigue strength of the fuel tank 10 is reduced. Accordingly, it is effective to apply an elastic coating film to the circumferential edge portion of the reinforcement 22 so that dust does not enter a mating portion (gap). Alternatively, it is also possible to close the gap by pouring tin-zinc solder into the gap. In particular, since strength is ensured on a surface in a case where solder is used, the effect of the reinforcement 22 is improved.

The diameter of the reinforcement 22 is set larger than the diameter of the chamber stay 20 by about 0 to 20 mm. In a case where the reinforcement 22 is not provided, the concentration of stress on the welded portions 23 where the chamber stay 20 and the lower panel 12 are spot welded to each other occurs. Accordingly, the deformation of the lower panel 12 is likely to occur. The positions of the welded portions 23 formed by spot welding are not particularly specified, but it is preferable that the positions of the welded portions 23 are near portions on which stress is likely to be concentrated at the time of pressure fluctuation and to which the first nuts 21 are fixed by projection welding. Examples of the welded portion 23 are shown in FIGS. 5 and 6. The first nuts 21 are fixed to the inner surface of the lower panel 12 through the chamber stay 20.

The first male screws 101 formed at the lower end portions of the pillars 100 are fitted to the first nuts 21, and the lower panel 12 and the pillars 100 are connected to each other through the first nuts 21 and the chamber stay 20. Accordingly, the lower end portions of the pillars 100 are fixed to the lower panel 12.

The lower end portions of the pillars 100 may be fixed to the lower panel 12 by welding or the like.

Figure 7:
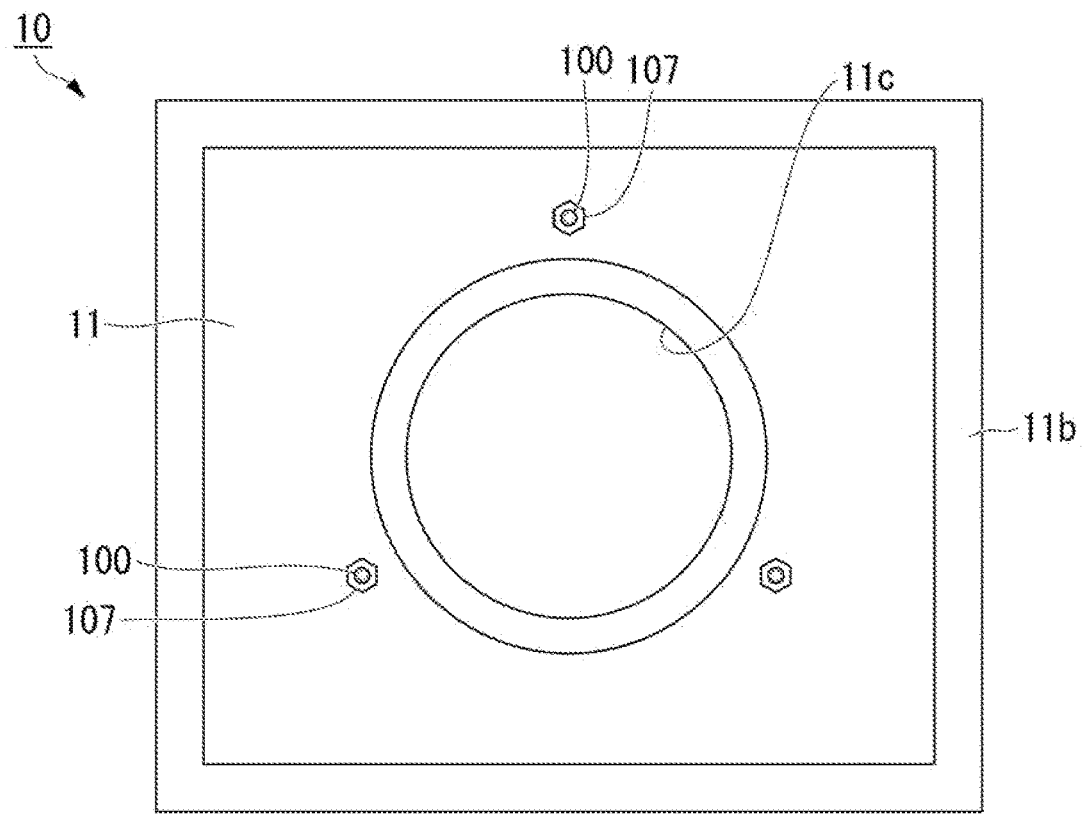
FIG. 7 is a top view of the upper panel.

As shown in FIGS. 6 and 7, the attachment of the pillars 100 on the upper panel 11 is performed using second nuts 107. The first hole 11c, which is used to attach the pump, is formed in the upper panel 11. Here, the first hole 11c is formed at the center of the upper panel 11 in a plan view. Second holes (holes) 11d used to attach the pillars 100 are opened in the upper panel 11. The second holes 11d are opened at portions immediately above the attachment positions of the first nuts 21 on the lower panel 12. In a case where the diameter of the second hole 11d is equal to the diameter of the pillar 100 and boring for forming a hole of which the diameter is larger than the diameter of the second hole 11d by about 0.5 mm is performed toward the outer surface of the upper panel 11, the second holes 11d are tapered and the upper end portions of the pillars 100 are easily attached. Further, a worker may put a hand into the fuel tank from the first hole 11c and adjust the positions of the pillars 100 to fit the upper end portions of the pillars 100 into the second holes 11d.

Furthermore, the concentration of stress is likely to occur at the edge portions of the second holes 11d of the upper panel 11. Tapering the second holes 11d by boring is also effective in relieving the concentration of stress that is caused by the deformation of the panels 11 and 12 at the time of pressurization and decompression.

A lower portion of the upper end portion of each pillar 100 is disposed in the second hole 11d, and an upper portion of the upper end portion of each pillar 100 protrudes upward from the second hole 11d. That is, a part of the pillar 100 is disposed in the interior space V. The flange 105 is disposed on the inner surface of the upper panel 11.

The attachment of the pillars 100 are performed by the threaded engagement of the second nuts 107 from the outside. The second nuts 107 are fitted to the second male screws 102 formed at the upper end portions of the pillars 100 in a state where the second nuts 107 are disposed on the outer surface of the upper panel 11, so that the second nuts 107 are fixed to the upper end portions of the pillars 100. The upper panel 11 is interposed between the second nut 107 and the flange 105 in a vertical direction. The upper end portions of the pillars 100 are fixed to the upper panel 11 in this way. The upper end portions of the pillars 100 may be fixed to the upper panel 11 by welding or the like.

In order to ensure sealing performance, a packing (a seal, a gasket, or an O-ring (not shown)) is installed between each second nut 107 and the upper panel 11. The material of the packing is not particularly specified, but the packing may be a doughnut-shaped washer 108A (see FIG. 4), which is punched out of a solder sheet, considering durability for long-term use. After the washer 108A is threadedly engaged with the pillar 100 by the second nut 107, heat is applied to the portion to melt the washer 108A and the washer 108A is further cooled and solidified to obtain solder 108. Accordingly, the solder 108 seals a gap between the upper panel 11 and the second nut 107, so that the sealing performance of the fuel tank 10 can be ensured.

In terms of preventing the corrosion of the nuts 21 and 107, plating treatment performed on the nuts 21 and 107 is preferable and electrogalvanizing, tin electroplating, tin-zinc electroplating, and nickel electroplating are recommended. That is, it is preferable that the outer surfaces of the nuts 21 and 107 are provided with a galvanized layer, a tin-plated layer, a tin-zinc-plated layer, or a nickel-plated layer.

In particular, in a case where a tin-zinc-plated steel sheet is used for the panels 11 and 12, tin-zinc electroplating is preferable in the sense that concern about electrolytic corrosion is reduced. Further, in a case where solder metal is used to seal fastening sections between the pillars 100 and the nuts 21 and 107 and heat is applied to melt the solder metal and to ensure sealing performance, tin-zinc electroplating is preferable since tin-zinc electroplating is excellent in solder wettability. Tin-zinc electroplating is also preferable in terms of ensuring sealing performance.

<3. Beam Structure>
[Beam Structure/Attachment Structure]

In a case where the pillars 100 are installed at the peripheral edge portion of the pump, the displacement of the upper surface and the bottom surface of the panels 11 and 12 at the time of positive/negative pressure can be suppressed. However, the aftereffect thereof appears near the flange portions 11b and 12b of the fuel tank 10 that are subjected to seam welding. That is, the displacement of the wall surfaces of the panels 11 and 12 are increased. In a case where the flange portions 11b and 12b of the fuel tank 10, which are subjected to seam welding, are reinforced and are attached to a vehicle frame by bolts through the reinforcements, displacement in a lateral direction (a direction orthogonal to a direction where the panels 11 and 12 face each other) is suppressed due to the effect of the rigidity of the vehicle frame. However, in a case where the flange portions 11b and 12b are attached to the vehicle frame by a belt, the displacement of the fuel tank 10 in the lateral direction cannot be suppressed.

Figure 8:
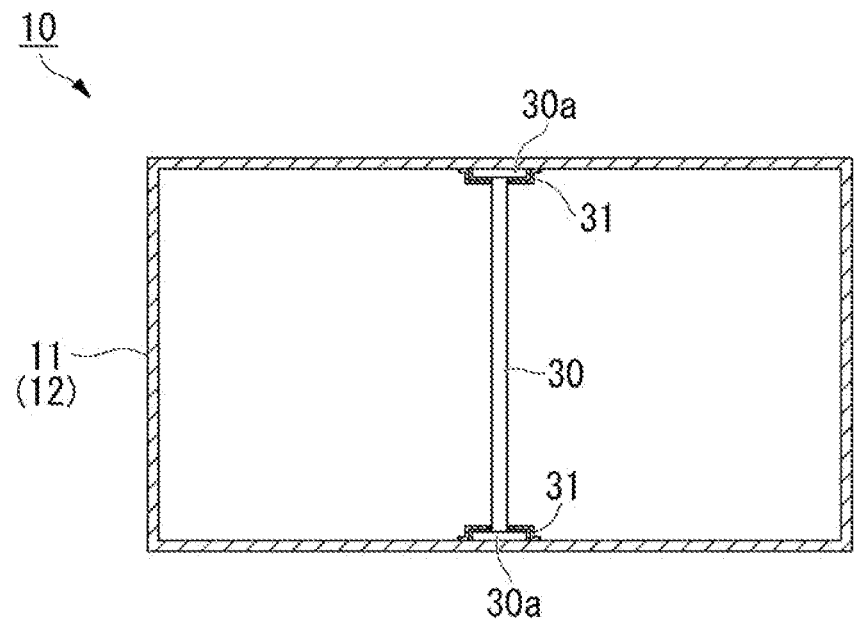
FIG. 8 is a transverse sectional view of a fuel tank according to a modification example of the embodiment of the invention.
Figure 9:
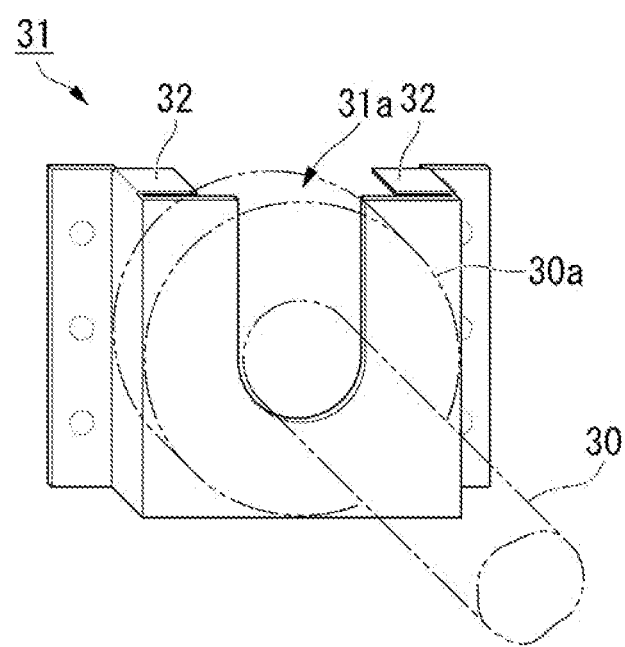
FIG. 9 is a perspective view of a jig.

In such a case, columnar beams 30 made of steel may be provided in the fuel tank 10 as shown in FIG. 8. After the panels 11 and 12 are pressed, attachments 31 shown in FIGS. 8 and 9, which are made of steel and are used to attach the beams 30, are attached to the wall surfaces of the panels 11 and 12 by spot welding. The beam 30 is shown in FIG. 9 by a two-dot chain line.

The attachments 31 have a hat-shaped structure, and flanges 30a provided at both ends of the beam 30 are fitted to the attachments 31. In order to prevent the attached beam 30 from coming off, fins 32 for preventing separation may be attached to an opening portion 31a of the hat-shaped structure. In a case where the flange 30a is fitted into the attachment 31, the fins 32 made of steel are bent inward. After the flange 30a is fitted into the attachment 31, the flange 30a does not come off due to the spring back of the fins 32. The size of the fin 32 is designed to have strength that allows the flange 30a to be manually fitted into the attachment 31. Further, the shape of the flange of the beam 30 may be a circular shape or a quadrangular shape. In a case where the shape of the flange is a quadrangular shape, the shape of the flange is a trapezoidal shape so that an upper bottom is shorter than a lower bottom. Accordingly, in a case where the flange is inserted into the space of the attachment 31 made of steel from the upper end side thereof, the flange is easily attached.

The strength of the attachment 31 is controlled by the sheet thickness or material of the attachment 31. However, it is also possible to ensure the strength of the attachment 31 on a surface by pouring solder metal into the gap of the attachment 31.

Figure 10:
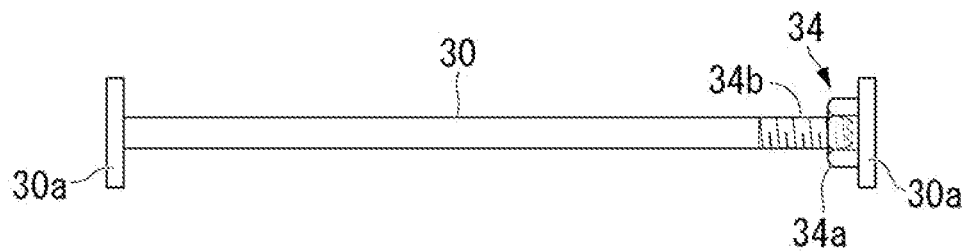
FIG. 10 is a top view of a beam structure.

As shown in FIG. 10, one end of the beam 30 has a flange structure including the flange 30a and the other end thereof have a screw structure 34. A nut 34a is attached to a quadrangular steel sheet by projection welding and a threaded portion 34b of the beam 30 is threadedly engaged with the nut 34a, so that a flange 30a of the other end is formed. Since the length of the beam 30 can be adjusted by the number of rotations of the beam 30 at the time of the threaded engagement, variations in the inner diameters of the panels 11 and 12 caused by the press accuracy of the panels 11 and 12 can be absorbed.

In a case where there is substantially no variation in press accuracy, both ends of the beam 30 may have a flange structure or may have a flange structure using a screw and a nut. The diameter of the U-shaped opening portion 31a of the attachment 31, which is hat-shaped metal fitting, needs to be increased in the case of the flange structure using a nut and a screw.

Figure 11:
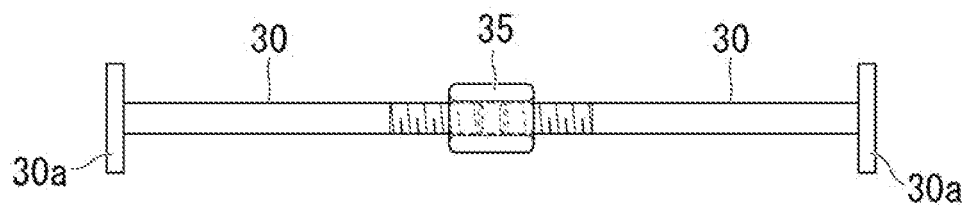
FIG. 11 is a top view of another beam structure.

Further, as shown in FIG. 11, two beams 30 of which one ends have a flange structure and the other ends have a screw structure are prepared and the screw structures of the two beams 30 can also be threadedly engaged with an extension nut 35 used for bolt fastening. In this case, the threading of the two beams 30 needs to be performed so that one beam has a right handed screw and the other beam has a left handed screw. The reason for this is to prevent the extension nut 35 from being unfastened due to the rotation of the screw caused by vibration. In a case where both ends of the entirety of the two beams 30 have a flange structure in this way, there is an effect of reducing the diameter of the U-shaped window of the attachment 31 for attaching, which is made of steel, to increase the rigidity of the attachment 31.

Which form of the beam 30 to use may be determined depending on the shape accuracy of the panels 11 and 12, the cost of the attachment 31 for a beam structure, the complexity of work at the time of assembly, and the like.

The beam 30 may be attached to a pair of wall surfaces, which face each other, of at least one of the upper panel 11 or the lower panel 12.

The wall surface of the fuel tank 10 tends to be displaced due to pressure fluctuation. The beam structure suppresses this displacement, but stress is concentrated on the spot-welding portions of the attachments 31 for attaching that support the beam 30. The places on which stress is concentrated are mating surfaces between the panels 11 and 12 of the fuel tank 10 and the attachments 31 that are made of steel and are used to attach a beam, and heat-affected zones during spot welding. The plastic deformation of the panels 11 and 12 gradually proceeds due to pressure fluctuation, and the panels 11 and 12 of the fuel tank 10 are finally damaged. In terms of preventing this, reinforcement plates for reinforcing strength may be installed on the sides opposite to the attachments 31 that are made of steel and are used to attach a beam. Accordingly, stress to be concentrated on the heat-affected zone can be dispersed. The reinforcement plates may have substantially the same sheet thicknesses as the panels 11 and 12, and the size of the reinforcement plate may be equal to the size of the attachment 31, which is used to attach a beam, or be larger than the size of the attachment 31 by about 0 to 20 mm in both the vertical direction and the lateral direction.

However, as described above, there is a concern that a gap is formed between the lower panel 12 and the reinforcement 22 at the time of pressure fluctuation, dust from the outside enters this gap, and fatigue strength is reduced. Accordingly, in order to prevent the adhesion of dust, it is necessary to apply an elastic coating film to the gap or to close the gap portion by soldering.

<4. Attachment of Baffle Plate>

A high-pressure tank is required as a fuel tank of a hybrid vehicle (HV) or a plug-in hybrid vehicle (PHV) as described above. In such a type of vehicle, it is quiet in the interior of the vehicle since the operating time of an engine is short. Accordingly, a driver is likely to hear the sound of sloshing fuel during driving. Pillars or beams can be used to suppress the sloshing of fuel.

Figure 12:
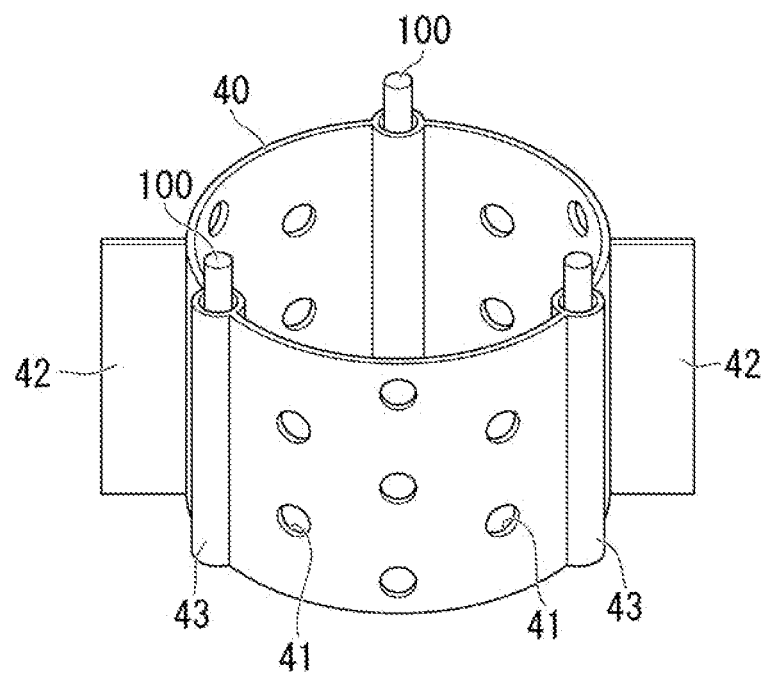
FIG. 12 is a perspective view of a second baffle plate attached to the pillars.
Figure 13:
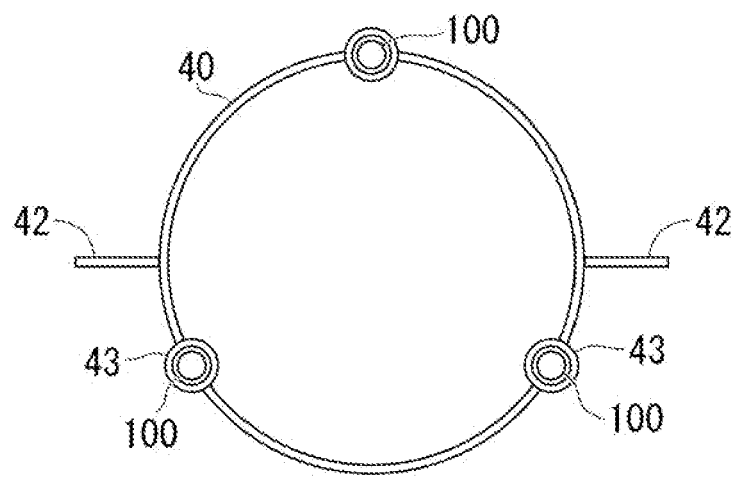
FIG. 13 is a top view of the second baffle plate.

As shown in FIGS. 12 and 13, the fuel tank 10 may include a sheet-shaped second (pillar) baffle plate 40 (also referred to as a standing panel). The second baffle plate 40 is disposed in the interior space V of the fuel tank 10 so that the direction of the smallest sheet thickness is along a horizontal direction, that is, a sheet surface is along a vertical direction. The second baffle plate 40 may be attached to the pillars 100. For example, holes 41 are formed in the side surface of the sheet-shaped second baffle plate 40 that is worked into a columnar shape (a hollow cylindrical shape) and is made of a resin, and fins 42 are further provided to suppress the flow of fuel. Columnar structures 43, which has a small-diameter hollow cylindrical shape to allow the pillars 100 to pass therethrough, are attached to the side surface of the columnar (hollow cylindrical) second baffle plate 40. The second baffle plate 40 is made to pass from above the pillars 100 after the pillars 100 are attached to the lower panel 12, so that the second baffle plate 40 can be attached in a state where the pillars 100 are fitted to the baffle plate 40. Accordingly, it is possible to suppress the sloshing of fuel occurring during traveling and to suppress the generation of sound. In a case where the second baffle plate 40 is made of a resin, the weight per volume occupied in the interior space V by the second baffle plate 40 can be reduced. The material of the second baffle plate 40 is not limited to a resin, and the second baffle plate 40 may be made of another material, such as steel.

Figure 14:
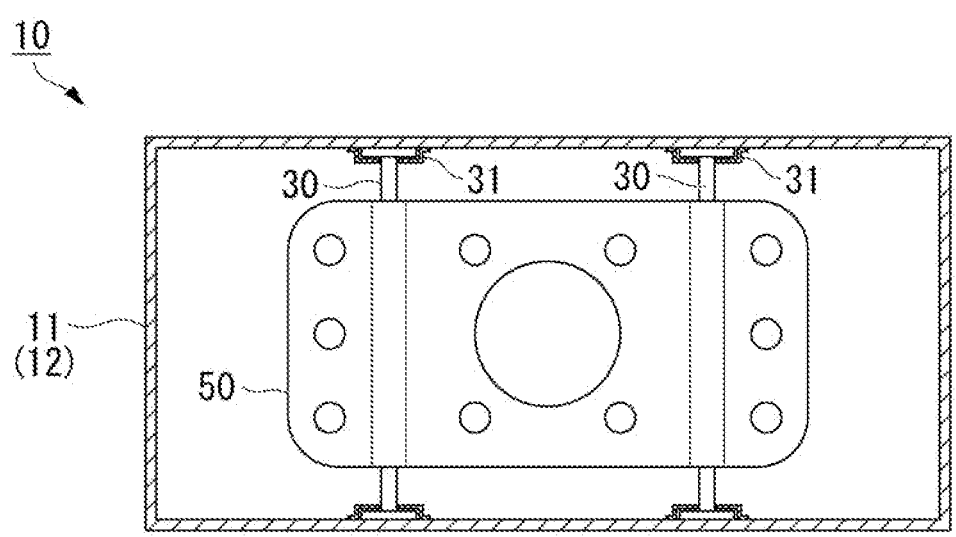
FIG. 14 is a top view of a first baffle plate attached to the beams.
Figure 15:
FIG. 15 is a side view of the first baffle plate.
Figure 16:
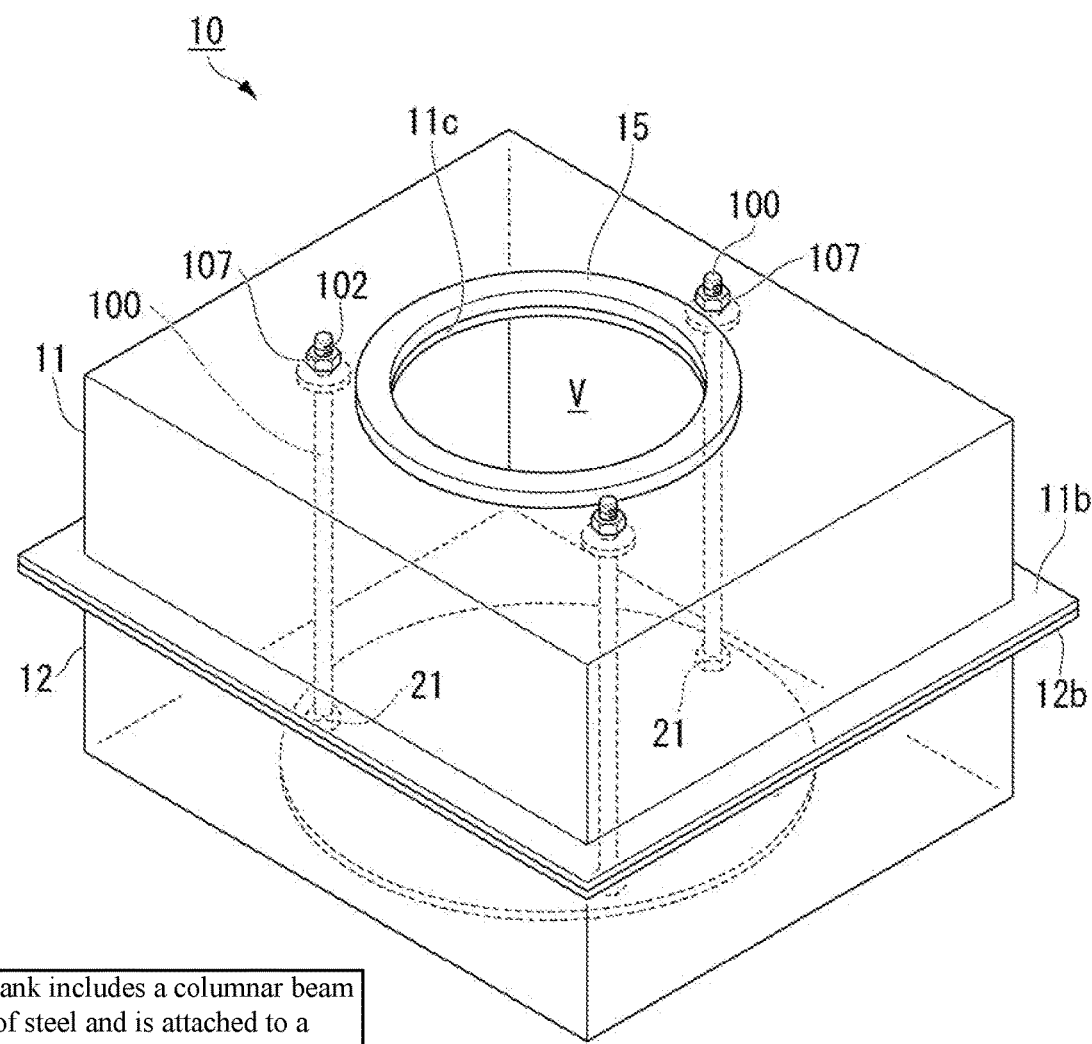
FIG. 16 is a perspective view showing the outline of a fuel tank according to an embodiment of the invention

The possibility that the number of rectangular parallelepiped fuel tanks for PHV is increased has been mentioned. In the case of such a shape, fuel is moved in the lateral direction by a centrifugal force when a vehicle turns during the travel of the vehicle, waves bounce when the fuel bumps into the lateral surface of the fuel tank, and the fuel falls along the upper surface of the fuel tank. Liquids collide with each other at this time, such that sound is generated. This sound is called splash sound. As shown in FIGS. 14 and 15, the fuel tank 10 may include a sheet-shaped first (beam) baffle plate 50 (also referred to as a lateral panel). The first baffle plate 50 is disposed in the interior space V of the fuel tank 10 so that the direction of the smallest sheet thickness is along the vertical direction, that is, a sheet surface is along the horizontal direction. The first baffle plate 50 may be attached to the pillars 100. In a case where two or more beams 30 are installed and the sheet-shaped first baffle plate 50 is provided using these beams 30 in a state where the first baffle plate 50 is laid over the plurality of beams 30 in the lateral direction (horizontal direction) so that the thickness direction of the sheet is along the vertical direction, the first baffle plate 50 can receive falling fuel and reduce splash sound. That is, since the first baffle plate 50 is supported in a state where the first baffle plate 50 is laid over the plurality of beams 30, the first baffle plate 50 can prevent the liquids from colliding with each other while withstanding an impact caused by the falling fuel. As a result, the first baffle plate 50 can effectively reduce splash sound. Since the first baffle plate 50 is attached to the beams 30 as described above, the beams 30 can be used both to suppress the deformation of the panels 11 and 12 and to support the first baffle plate 50, the durability of the fuel tank 10 can be improved, the sloshing of fuel occurring during traveling can be suppressed, and the generation of sound can be suppressed. Further, a sheet-shaped body, which extends in the vertical direction from one end or both ends of the first baffle plate 50 made of a resin, is formed and the cross-sectional shape of one end or both ends of the first baffle plate 50 is an L-shape so that the sheet-shaped body can also have the function of a standing panel.

The type of resins, which are used to form the second baffle plate 40 and the first baffle plate 50, are not particularly limited, but high-density polyethylene, polyacetal, nylon, and the like are conceivable. In a case where the baffle plates 40 and 50 are to be coated and baked after being assembled with the fuel tank 10, a resin corresponding to a baking temperature needs to be selected. The melting point of the resin should be equal to or higher than the baking temperature.

The baffle plates 40 and 50 made of resins do not need to be obtained by integral molding. The sheet-shaped plate may be divided into several parts, and the parts may be separately molded and then joined by a snap-fit structure.

<5. Action of Pillar and Beam>

[Pillar]

In a case where the upper panel 11 and the lower panel 12 are made to face each other and the flange portions 11b and 12b are made to overlap each other, the upper end portions of the pillars 100 attached to the lower panel 12 penetrate the second holes 11d formed in the upper surface of the upper panel 11. The second holes 11d are provided around the first hole 11c that is used to attach a pump. For this reason, even though the pillars 100 cannot penetrate the second holes 11d of the upper panel 11 due to poor arrangement accuracy of the pillars 100, a worker can put his hand into the fuel tank from the first hole 11c, which is used to attach a pump, to adjust the positions of the pillars 100. Accordingly, the upper end portions of the pillars 100 can be simply put into the second holes 11d. After making the upper end portions of the pillars 100 penetrate the second holes 11d, the worker fixes the pillars 100 through sealing packings by the second nuts 107 from the outside of the upper panel 11. In this way, the pillars 100 can be easily installed in the interior space V of the fuel tank 10.

At least one or more pillars 100, but preferably three or more pillars 100, are installed in the fuel tank 10. Since the displacement of the panels 11 and 12 caused by pressure is insufficiently suppressed in a case where one pillar 100 is installed, there is a possibility that the panels 11 and 12 are deformed with a portion, at which the pillar 100 is installed, as a fulcrum and strain is concentrated around the pillar 100. In a case where two pillars 100 are installed, there is a concern that the panels 11 and 12 are displaced to rotate about a line, which connects the end portions of the two pillars 100, as an axis. In a case where three pillars 100 are installed, a plane, which connects end portions of the three pillars 100, is completely fixed. Accordingly, the rigidity of the fuel tank 10 is ensured. In a case where four or more pillars 100 are installed, a load applied to each pillar 100 is reduced but the load of work for attaching the pillars 100 is increased.

Here, the fuel tank is installed in a vehicle and is used as a member that stores, for example, gasoline as fuel. However, gasoline stored in the fuel tank is affected by an exhaust pipe passing near the fuel tank due to outside air or structure, so that the temperature of the gasoline rises. For this reason, the vapor pressure of the gasoline rises, so that positive pressure is generated in the fuel tank. For example, the vapor pressure of the fuel decreases due to a decrease in temperature during parking at night, so that negative pressure may be generated in the fuel tank. Further, the amount of liquid is reduced with the consumption of the fuel during driving, so that pressure in the fuel tank may drop. Furthermore, it is also conceivable that pressure in the fuel tank drops due to the purge of gasoline vapor to an engine side through a canister. In this way, positive pressure and negative pressure are repeatedly generated in the fuel tank. In a case where the shape of the fuel tank is changed due to a change in pressure, strain generated at part of the panel exceeds the yield point of the steel and is in a plastic range. For this reason, there is a concern that low-cycle fatigue is caused. Since the amount of deformation of the fuel tank can be suppressed by an increase in a sheet thickness, a sheet thickness is usually designed so that low-cycle fatigue is not caused.

Further, vibration fatigue, that is, high-cycle fatigue is also considered in the design of a sheet thickness. The fuel tank is attached to the lower portion of a vehicle by bolts or belts. In a case where the vehicle travels, vibration from a road surface is transmitted to the fuel tank. The fuel tank has a predetermined vibration eigenvalue. In a case where a sheet thickness is reduced, the eigenvalue is reduced, a frequency approaches a frequency input from the road surface, and a resonance phenomenon is likely to occur. For this reason, a sheet thickness may be determined in order to avoid vibration fatigue.

As described above, it has been difficult to reduce a sheet thickness in the fuel tank made of steel in the related art in order to avoid pressure fatigue and vibration fatigue.

Furthermore, a fuel tank having high pressure resistance also has been required in recent years. Due to a tendency for vapor emission regulations to be tightened, the installation of an activated carbon canister is employed in this fuel tank so that gasoline vapor is not dissipated to the atmosphere from a fuel system. Gasoline vapor adsorbed by the canister is purged during the operation of an engine and is not released into the atmosphere. At this time, the canister is dried. However, since the operating time of an engine is short in an electric vehicle with a generator or a plug-in hybrid vehicle, it is difficult to dry the canister that absorbs the gasoline. It is necessary to increase the opening pressure of an isolation valve of the fuel tank in order to reduce the load on the canister, and the amount of pressure to be increased is in the range of 30 to 40 kPa. Since a panel having a thickness about twice a normal thickness should normally be used in order to build a fuel tank that is made of steel and withstands this pressure, the weight of the fuel tank is increased.

As described above, it has been difficult to reduce the sheet thickness of the panel of the fuel tank made of steel in the related art in order to ensure rigidity. Accordingly, a method of reducing the weight of a fuel tank by installing pillars made of a resin in the tank made of steel to improve pressure resistance is disclosed as Patent Document 2. This is a method in which threading is performed on a moutinging jig for reinforcing made of metal and resin pillars are threadedly engaged with the moutinging jig for reinforcing, but at least a parallel surface on which the moutinging jig for reinforcing is to be installed needs to be formed on a lower surface facing an upper surface of the fuel tank. Accordingly, the invention is to allow pillars to be installed in a very small area using nuts instead of the moutinging jig for reinforcing in order to prevent the deformation of the circumferential edge of an opening portion for a pump of the fuel tank that is caused by pressure.

[Beam]

The lateral swell of portions near flange portions, which are to be subjected to seam welding in the fuel tank, has been a problem during the examination of a pillar structure that connects the upper surface to the lower surface. In the case of a flat fuel tank, the swell of the fuel tank in the vertical direction has been large and the swell of the fuel tank in the lateral direction has not been so problematic. In the case of a fuel tank of which the distance between the upper and lower surfaces is long, that is, the height is large, a phenomenon where the fuel tank swells in the lateral direction when the swell of the fuel tank in the vertical direction is suppressed has been seen. The use of a band for attaching the fuel tank to a floor is general as a method of suppressing the swell. However, since this band is also applied to a structure in which the upper surface of the fuel tank abuts the floor and the fuel tank is supported by the band from the lower side, this band has been almost not effective for the swell of the fuel tank in the lateral direction.

In the case of a tank made of steel, upper and lower panels are separately manufactured by pressing and baffles, pipe lines, pipes, and valves are attached inside the upper and lower panels. Accordingly, the beam structure can also be attached. So far, there have been examples where baffles are used for a beam structure. For example, in a drum tank for a commercial vehicle, a body is wound, a quadrangular baffle is press-fitted into the body formed of a square tube after longitudinal seam welding is performed, and flanges formed at four corners of the baffle are fixed by spot welding. This is also possible in a case where the number of parts installed inside is small, but it is expected that various parts for adjusting pressure are attached in the case of a high-pressure tank for PHV. For this reason, it is conceivable that the various parts may interfere with the baffle. In such a case, there is less interference with the parts as long as a beam structure has a columnar shape.

<6. One Design Example>

The fuel tank 10 according to this embodiment described above can be designed by using a computer simulation using, for example, a finite element method. Specifically, first, in a case where pressure in the fuel tank 10 is positive pressure or negative pressure in a state where the pillars 100 are not provided, positions having a high strain range generated in the fuel tank are obtained. The pillars 100 are attached to places which are close to a position having the maximum strain range and into which a hand can be put from the first hole 11c for the fuel tank 10. Since it is unstable in a case where one pillar 100 is installed, two pillars 100 are installed if possible. Then, a third pillar 100 is installed at an apex portion of an isosceles triangle of which a base is formed by the points where the two pillars 100 are installed. The second holes 11d are formed near the first hole 11c, which is used to attach a pump, of the upper panel 11, and the pillars 100 are made to penetrate the second holes 11d and are fastened by the second nuts 107. In order to attach a fuel pump, an annular moutinging jig, which is called a retainer 15 shown in FIG. 1, has a thickness in the range of 2 to 4 mm, and is made of metal, is attached to the circumferential edge portion of an opening of the first hole 11c of the upper panel 11. However, it is preferable that the pillars 100 are installed near the retainer 15. The reason for this is not only to use the rigidity of the retainer 15, but also to allow a worker to put a hand into the fuel tank from the hole of retainer 15 to perform work during the assembly of the fuel tank 10 to attach the pillars 100. This prevents fatigue of the upper panel 11 to which the pillar 100 is attached.

After that, a force applied to the pillar 100 is calculated by a computer simulation, and the diameter of the pillar 100, which allows a sufficient tensile force and sufficient buckling strength to be obtained, is determined. It is preferable that the strength of the pillar 100 is twice or more a force applied to the pillar 100. The reason for this is to use the pillar 100 in a complete elastic range to prevent the fatigue fracture of the pillar 100.

Appropriate pillars 100 are installed around the retainer 15, and pressure is further calculated. In a case where there is a concern about fatigue fracture since the swell of the fuel tank is increased in the lateral direction and strain is increased near the flange portions 11b and 12b subjected to seam welding, the beams 30 are installed. Places at which the beams 30 are to be installed are near a portion where strain is large.

As one specific example, it is assumed that the sheet thickness of a general high-pressure tank made of steel is 1.6 mm. Further, the sum of the weights of the upper panel 11 and the lower panel 12 is set to 16 kg. In a case where three pillars 100 are installed in such a fuel tank 10, it is found that the sheet thickness can be reduced to 1.2 mm while the same pressure resistance as that in the case where the sheet thickness is 1.6 mm is secured. The weight of the panel at this time is 12 kg. Furthermore, in a case where the sheet thickness is set to 1.0 mm, the possibility of fatigue cracks is shown near a seam weld bead. Accordingly, in a case where one beam 30 is added, it is found that pressure resistance is ensured even though the sheet thickness is 1.0 mm. The weight of the panel at this time is 10 kg. In a case where the pillars 100 made of steel having a diameter of 6 mm are used, the weight of one pillar 100 or one beam 30 including the weight of the nuts is 100 g or less. Even though this weight is added, a weight can be significantly reduced from the original weight.

Next, a relationship between the shape of the fuel tank and the pillars 100 and the beams 30 will be described.

The upper panel 11 with a flange and the lower panel 12 with a flange are separately pressed, internal parts are attached, and the flange portions 11b and 12b overlap with each other and are subjected to seam welding, so that the fuel tank 10 made of steel is worked into an integrated part. Since the rigidity of the side surfaces of the fuel tank 10 is increased by seam welding portions of the fuel tank 10, the rigidity of the upper and lower surfaces is relatively low. For this reason, in a case where the upper and lower surfaces of the fuel tank 10 are connected to each other by the pillars 100, the rigidity, that is, pressure resistance of the entire fuel tank 10 can be increased.

The internal pressure of the fuel tank 10 is evenly applied to the inner surface of the fuel tank 10. Accordingly, the surface having low rigidity is significantly deformed, so that pressure fatigue fracture is caused. In a case where the pillars 100 are installed on the upper and lower surfaces to increase the rigidity of the upper and lower surfaces and to reduce the amount of change, a phenomenon where fatigue fracture occurs at the seam weld bead portions of the side surfaces has been seen. That is, in a case where the upper and lower surfaces are not supported by the pillars 100, the rigidity of the upper and lower surfaces is lower than the rigidity of the side surface. However, in a case where the upper and lower surfaces are supported by the pillars 100, a relationship in terms of the magnitude of rigidity is reversed and the rigidity of the side surface is lower than the rigidity of the upper and lower surfaces.

Further, it has been found that the fatigue cracks of the side surface are seen in a case where the rigidity of the upper and lower surfaces exceeds the rigidity of the side surface due to the installation of the pillars 100. In such a case, it has been found that pressure resistance can be further improved by the employment of a beam structure (a structure in which columnar beams 30 made of steel are attached to at least one of the lower panel 12 or the upper panel 11). The shape of the fuel tank 10, for which the beam structure is to be used, will be described additionally.

Hereinafter, the dimensions of the rectangular parallelepiped-shaped fuel tank 10 will be defined as a width W, a length L, and a height H, surfaces (upper and lower surfaces) surrounded by the width W and the length L will be defined as WL surfaces, and pressure applied to the WL surface will be denoted by PWL. Likewise, a surface (side surface) surrounded by the width W and the height H will be defined as a WH surface, pressure applied to the WH surface will be denoted by PWH, a surface (side surface) surrounded by the length L and the height H will be defined as an LH surface, and pressure applied to the LH surface will be denoted by PLH. A seam weld line (weld bead) is continuously provided on the WH surfaces and the LH surfaces, which are the side surfaces of the fuel tank 10, to go around the fuel tank 10.

The shape of the fuel tank 10 can be broadly classified into three, that is, a cubic tank, a flat tank, and a rectangular parallelepiped tank. A cubic tank has a shape in which a width W, a length L, and a height H are substantially equal to each other. A flat tank has a shape in which a width W and a length L are substantially equal to each other and a height H is smaller than the width W and the length L. A rectangular parallelepiped tank has a shape in which a width W or a height H are large and a length L is small.

A point of view of the pillars 100 and the beams 30 in a case where the shape of the fuel tank 10 is each of the cubic tank, the flat tank, and the rectangular parallelepiped tank will be described below.

(1) In the Case of a Cubic Tank

In PHV, a battery or a device for controlling the battery may be installed under a rear seat, and a fuel tank may be installed next to the battery or the device. The shape of the fuel tank is close to the shape of a cube. In a case where the capacity of the fuel tank is denoted by Vo and the surface area thereof is denoted by S, a hexahedron of which the volumetric efficiency Vo/S is maximized is a cube, which can be said to be a reasonable shape.

Since the fuel tank is a cube, "PWL=PWH=PLH" is satisfied. Here, pressure applied to surfaces facing each other is the same. The rigidity of the side surface is higher than the rigidity of the upper and lower surfaces due to the flange structure subjected to seam welding. Accordingly, in a case where the upper and lower surfaces having relatively low rigidity are provided with the pillars 100, the rigidity of the entire fuel tank 10 can be made equal. Therefore, the beams 30 do not need to be installed.

(2) In the Case of a Flat Tank

The height H of the fuel tank 10 may be about 100 to 200 mm in order to take a large interior space of a vehicle. Since the areas of the upper and lower surfaces are large in such a fuel tank 10, a pressure load applied to the upper and lower surfaces is larger than a load applied to the side surfaces. That is, since "PWL>PWH(PLH)" is satisfied, the rigidity of the upper and lower surfaces does not exceed the rigidity of the side surfaces even though the rigidity of the upper and lower surfaces is increased by the installation of the pillars 100. Accordingly, the beams 30 do not need to be installed.

(3) In the Case of a Rectangular Parallelepiped Tank

The fuel tank 10 may be installed in the rear of a battery. A rectangular parallelepiped tank of which the width W or the height H of the fuel tank 10 along the transverse direction of a vehicle is large and the length L along the longitudinal direction of the vehicle is small is employed in such a case. Internal pressure applied to such a fuel tank 10 is as follows.

(In a Case where the Length L is Equal to the Height H) PWL=PWH or (In a Case where the Length L is Smaller than the Height H) PWL<PWH Since the rigidity of the upper and lower surfaces is increased in a case where the pillars 100 are installed on the upper and lower surfaces, the rigidity of the WH surface is the lowest. Beams 30 are required to make up for this.

From the examination of the installation of the beams 30 is examined in the case of L<H, it is preferable that the beams 30 are installed in a case where the ratio of the height H to the width W exceeds 1.5. With regard to the suppression (support) of deformation caused by pressure applied to the WH surfaces, in a case where the width W is increased since the LH surfaces are provided on both sides of the WH surface, the deflection of the WH surface is increased and the deformation of the middle portion of the WH surface is increased. For this reason, there is a concern about fatigue fracture caused by the fluctuation of pressure applied to the WH surface. Accordingly, preferably, in a case where W/H is larger than 1.5, one or more beams 30 can be installed to suppress deformation and to increase pressure rigidity and fatigue resistance. Since a pump for sucking up fuel is installed in the fuel tank 10, the beams 30 may be installed at positions avoiding the pump. The positions at which the beams 30 are to be installed and the number of the beams 30 to be installed are determined using a computer simulation.

INDUSTRIAL APPLICABILITY

The pressure resistance of a fuel tank can be increased and the weight of the fuel tank can be reduced.

BRIEF DESCRIPTION OF THE REFERENCE SYMBOLS

10: fuel tank
11: upper panel
12: lower panel
30: beam
40: second baffle plate
50: first baffle plate
100: pillar
108: solder
V: interior space

The invention claimed is:

1. A fuel tank comprising:
    a lower panel made of steel and an upper panel made of steel;
    at least one pillar made of steel which is disposed in an interior space formed by the lower panel and the upper panel facing each other and of which a first end portion is fixed to the lower panel and a second end portion is fixed to the upper panel in a state where the second end portion is disposed in a hole formed in the upper panel;
    a first nut which is made of steel and is fixed to an inner surface of the lower panel and to which the first end portion of the pillar is fitted;
    a flange that is disposed on an inner surface of the upper panel and is fixed to the pillar, the flange having a tapered portion, which is inclined downward toward an outside in a radial direction of the flange; and
    a second nut which is made of steel and is disposed on an outer surface of the upper panel and to which the second end portion of the pillar is fitted so that the upper panel is interposed between the flange and the second nut.

2. The fuel tank according to claim 1, further comprising:
    a tin-plated layer or a tin-zinc-plated layer that is provided on outer surfaces of the pillar, the first nut, and the second nut.

3. The fuel tank according to claim 1, further comprising:
    solder that seals a gap between the upper panel and the second nut.

4. The fuel tank according to claim 1,
    wherein a columnar beam made of steel is attached to a pair of wall surfaces, which face each other, of at least one of the lower panel or the upper panel.

5. The fuel tank according to claim 4,
    wherein a beam baffle plate is attached to the beam.

6. The fuel tank according to claim 1,
    wherein a pillar baffle plate is attached to the pillar.

7. The fuel tank according to claim 2, further comprising:
    solder that seals a gap between the upper panel and the second nut.

* * * * *